US006439281B1

(12) United States Patent
Hogg

(10) Patent No.: US 6,439,281 B1
(45) Date of Patent: Aug. 27, 2002

(54) WHEELCHAIR TIRE COVER

(76) Inventor: Alan J. Hogg, P.O. Box 10, Yankeetown, FL (US) 34498

(*) Notice: Subject to any disclaimer, the term of this patent is extended or adjusted under 35 U.S.C. 154(b) by 0 days.

(21) Appl. No.: 09/531,795

(22) Filed: Mar. 21, 2000

Related U.S. Application Data

(60) Provisional application No. 60/162,731, filed on Oct. 29, 1999.

(51) Int. Cl.[7] .............................................. B60C 11/00

(52) U.S. Cl. ........................ 152/152; 152/221; 152/217

(58) Field of Search ................................ 152/170, 173, 152/175, 185, 217, 218, 221, 187, 186; 206/304, 304.1, 127, 128; 118/504, 505

(56) References Cited

U.S. PATENT DOCUMENTS

| | | | | | |
|---|---|---|---|---|---|
| 544,688 | A | * | 8/1895 | Pulbrook | 152/167 |
| 710,562 | A | * | 10/1902 | Caters | 152/173 |
| 1,229,115 | A | * | 6/1917 | Metcalf | 152/185 |
| 1,388,264 | A | * | 8/1921 | Keavey | 152/170 |
| 1,689,438 | A | * | 10/1928 | Jellison | 152/170 |
| 1,696,009 | A | * | 12/1928 | McCormick | 152/170 |
| 1,700,081 | A | * | 1/1929 | Schemmel | 152/187 |
| 1,753,519 | A | * | 4/1930 | Kanner | 152/173 |
| 1,892,780 | A | * | 1/1933 | George | 206/304 |
| 1,910,416 | A | * | 5/1933 | Wollhelm | 206/304.1 |
| 2,552,287 | A | * | 5/1951 | Layne | 118/505 |
| 2,652,023 | A | * | 9/1953 | Kletsky | 118/505 |
| 2,930,348 | A | * | 3/1960 | Fannin | 118/505 |
| 3,214,011 | A | * | 10/1965 | Olson | 206/304 |
| D278,390 | S | | 4/1985 | Bailey | |
| 4,605,239 | A | | 8/1986 | Warfel | |
| 4,733,705 | A | * | 3/1988 | Dwiggins | 152/177 |
| 4,978,174 | A | * | 12/1990 | Nosler | 301/37.1 |
| 5,439,727 | A | * | 8/1995 | Riggs et al. | 428/128 |
| D367,629 | S | * | 3/1996 | Whitehead | D12/133 |
| 5,624,509 | A | * | 4/1997 | Stanley | 152/175 |
| 5,785,340 | A | * | 7/1998 | Dias | 280/304.1 |
| 5,860,180 | A | | 1/1999 | Heise | |
| 6,032,972 | A | * | 3/2000 | Dias | 280/304.1 |
| 6,116,415 | A | * | 9/2000 | Rastelli | 206/304.1 |
| 6,273,159 | B1 | * | 8/2001 | Page | 152/170 |

* cited by examiner

*Primary Examiner*—S. Joseph Morano
*Assistant Examiner*—Long Bao Nguyen
(74) *Attorney, Agent, or Firm*—John L. DeAngelis Jr.; Beusse Brownlee Bowdoin & Wolter PA

(57) ABSTRACT

A removable cover for a wheelchair tire. The cover is used to protect against the spread of contamination by the wheelchair tire. The cover may be formed of an elastic material or may have bands of elastic material attached along opposed edges to facilitate the installation of the cover over the tire and to hold the cover against the tire. The cover may be stored on the wheelchair during periods of movement over a contaminated surface, and then installed over the tire prior to moving onto a clean surface. The cover may be periodically washed to maintain its cleanliness or may be made from a disposable material.

25 Claims, 3 Drawing Sheets

WHEELCHAIR TIRE COVER

This application claims the benefit of the Oct. 29, 1999, filing date of U.S. Provisional patent application Ser. No. 60/162,731.

BACKGROUND OF THE INVENTION

This invention relates generally to the field of wheelchairs, and more specifically to a protective cover for the wheelchair tires to protect the user and his environment from hazardous contaminates.

Wheelchairs are well known in the art, being the subject of well over a thousand United States patents. Motive power for a wheelchair may be provided by an electric motor, or more commonly, by the hands and arms of the wheelchair user. By pushing or pulling on one or both of the main wheels of a wheelchair, a user is able to propel a wheelchair either forward, backward, or through a turn. Manually powered wheelchairs are equipped with push rings attached to each of the main wheels. The push rings provide a clean, smooth surface for the user to grip in order to propel, steer and stop the wheelchair. Because the tires of a wheelchair must necessarily roll over and through any variety of surfaces, they typically become contaminated with foreign matter and often become contaminated with substances that are hazardous to the health of the wheelchair user. The push rings generally provide the user with an alternative to touching the contaminated tire surface. However, because the push rings generally have a smaller diameter than the tires, and because they are typically made with a smooth metal surface having a lower coefficient of friction than the tires, it is at times not possi the required driving force through the push rings as may otherwise be exerted by gripping the tires. Push rings are sometimes wrapped with a cloth or leather wrap to improve the user's grip, however, wheelchair users often find themselves using the tires to propel the wheelchair in spite of the contaminated surface of the tire.

It should be appreciated that the tire surface and any associated crevices, such as the inside of the tire tread, are prone to accumulate foreign substances that are not only unpleasant to touch but may also present a critical health hazard to the wheelchair user. It is generally thought that various viruses and bacteria survive for an extended period of time within the crevices of a wheelchair tire. Such hazardous contaminations may be transferred to the wheelchair user's hands, and from the hands to the user's eyes, nose, mouth and any cut or abrasion in the skin. Such hazardous contaminates can also be transferred to any companion of the wheelchair user coming in contact with the contaminated tire or wheelchair user. In order to provide a degree of protection from such health hazardous contamination, wheelchair users often utilize gloves to isolate their hands from contamination present on the wheelchair tires. Gloves provide only a limited protection from a direct contamination of the hands because wheelchair gloves are designed without finger coverage. Therefore, the user is still at a health risk if he/she touches the contaminated tire with his/her fingers or touches any other part of the body with the contaminated glove or fingers.

In addition to protecting the user and immediate companions, there is also the need to protect against the spread of contamination onto non-contaminated flooring surfaces. In particular, after moving a wheelchair over a surface contaminated with a foreign substance, the user may desire to move the wheelchair onto a clean surface, such as the carpet in his/her home. Simply rolling the wheelchair over a clean surface may remove the bulk of foreign matter on the tires, thus making the tires appear clean. However, invisible contaminants may remain, as well as bulk contamination within the tire treads. Once inside the home, this contamination will spread, particularly onto carpets, thereby turning what is normally a safe home environment into a health hazardous space.

Various devices have been developed to clean the tires of a wheelchair prior to rolling onto a clean surface. One such device is the cleaning apparatus described in U.S. Pat. No. 5,860,180 issued on Jan. 19, 1999 to Heise. However, known cleaning devices are inconvenient to store and to use and they are costly. Furthermore, even after a wheelchair tire is cleaned with one of the prior art cleaning devices, it may still leave marks on a light colored rug or floor, such as when a black tire is turned sharply on a white tile floor, thereby leaving a skid mark. Tire designs having a desirable aggressive tread pattern are more prone to leaving skid marks on a light colored surface. More advantaged wheelchair users will often have one set of gray tires for indoor use and a separate set of standard, deep tread, black rubber bicycle tires for outdoor use.

BRIEF SUMMARY OF THE INVENTION

Thus there is a particular need for an apparatus and method for protecting against the spread of hazardous contamination by wheelchair tires. Such a device and method should desirably be inexpensive and simple for a wheelchair user to operate. Advantageously, such device and method may also protect against the accidental marking of a light colored floor or rug.

Accordingly, a wheelchair is described herein comprising a chair portion; a wheel rotatingly attached to the chair portion; a tire attached around a rim of the wheel; and a cover removably attached around the tire. Also disclosed herein, is a method for protecting against the spread of contamination by a wheelchair tire, the method comprising the steps of: providing a cover adapted to be removably installed over a wheelchair tire; and covering a contaminated wheelchair tire with the cover prior to rolling the tire onto a surface to be protected from contamination.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
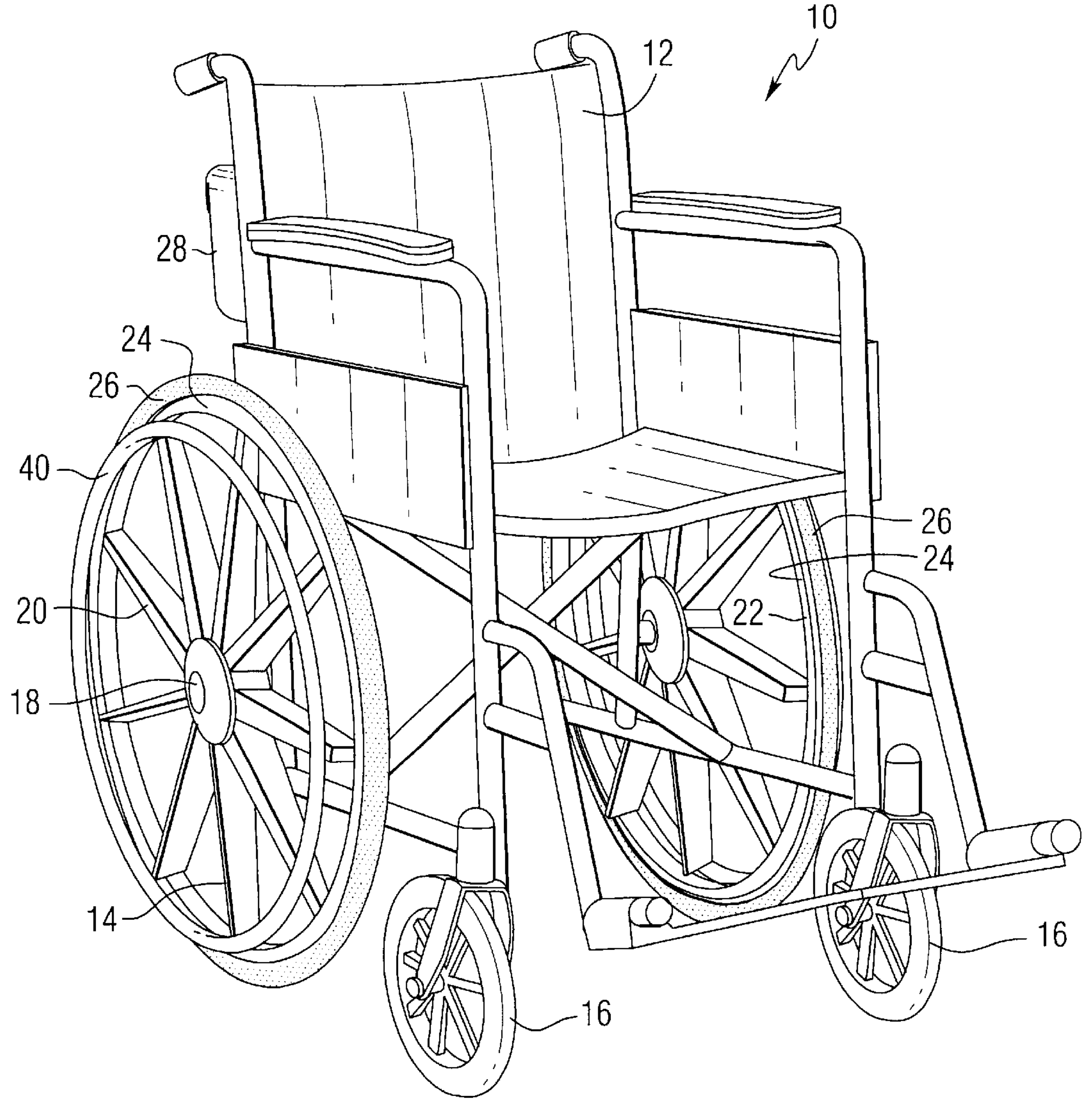
FIG. 1 is a perspective view of a wheelchair having a protective cover wrapped around the wheelchair tires.

FIG. 1 illustrates a perspective view of a wheelchair 10 including a chair portion 12 and a wheel 14 rotatingly attached to the chair portion 12. A pair of such rear wheels 14 provides the primary support for the wheelchair 12. A smaller, secondary set of wheels 16 are attached near the front of the chair portion 12 to provide stability for the wheelchair 10. Wheel 14 includes a hub 18, spokes 20, and a rim 22. A tire 24 is attached around rim 22, and may be any known solid, tube or tubeless design having any variety of tread patterns formed thereon. A protective cover 26 is removably attached around the tire 24.

Cover 26 provides a flexibility of operation for the wheelchair 10 which addresses many of the problems of the prior art. Wheelchair 10 may be operated with covers 26 temporarily removed from the tire 24 and stored on the wheelchair 10, such as inside pouch 28. When the wheelchair 10 is moved over a surface contaminated with a foreign substance, tires 24 will become contaminated with the foreign substance. Prior to moving wheelchair 10 onto a clean surface not contaminated with the foreign substance, the covers 26 may be installed over the tires 24. In this manner, a surface which is not contaminated will remain protected from the harmful residual amounts of the contaminating foreign substance remaining on the tires. This method of operating a wheelchair may be used, for example, when moving the wheelchair 10 onto a surface in the wheelchair user's home or office. By installing the cover 26 over the tires 24 of the wheelchair 10 upon entering a home or office, the user not only protects the flooring and people within the space from potentially hazardous contamination remaining on the tires and within the tire treads, but also protects the flooring from skid marks that may otherwise be left on the floor by the tires. Upon exiting the home or office and rolling the wheelchair tires off of the surface to be protected from contamination, the covers 26 may be removed from the tires 24 in order to avoid contaminating the outside surface of the cover 26. The covers 26 may be conveniently stored in pouch 28 or other location on the wheelchair 10 before being reinstalled over the tires 24 prior to again moving the wheelchair 10 into a space where the flooring is maintained as a clean surface.

The front wheels 16 of wheelchair 10 are generally treadless and made from a plastic or polyethylene material which tends not to accumulate contamination and not to leave marks on light colored flooring. In the event that they become contaminated with a hazardous material, they can be easily cleaned because of their smooth surface. Therefore, it is less beneficial to install a removable cover on wheels 16. However, it may be appreciated that additional covers for wheels 16 may be utilized in certain applications.

Figure 3:
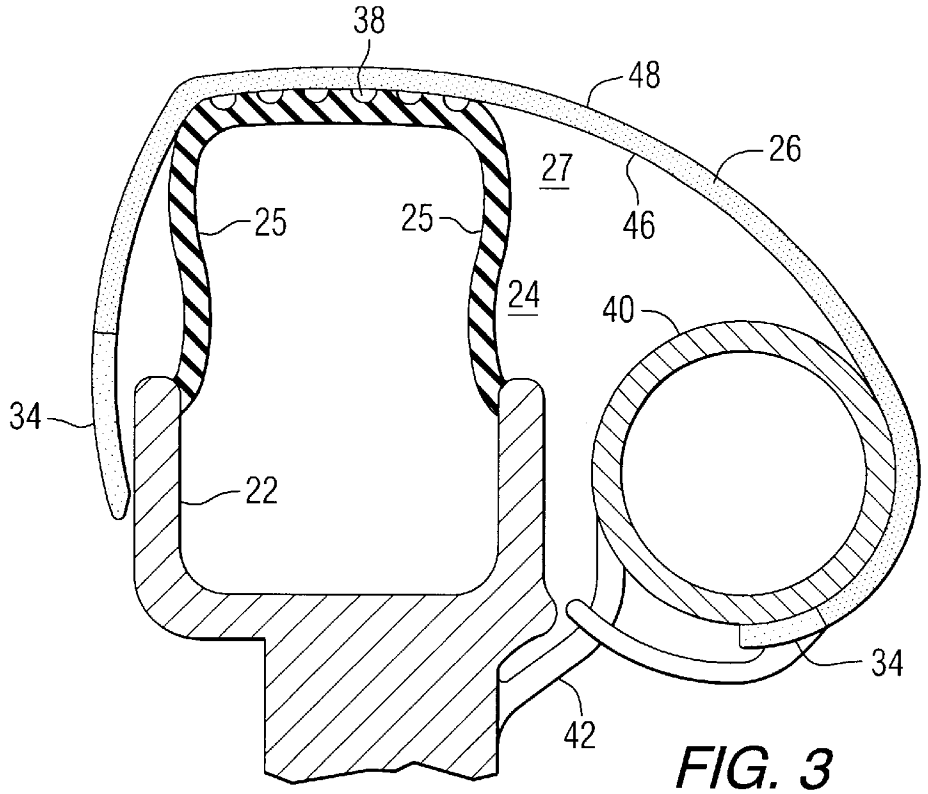
FIG. 3 is a sectional view of a protective cover disposed over a wheelchair tire and push ring.

Cover 26 can be sized to extend over push ring 40 which is attached to wheel rim 22 by bracket 42, as illustrated in FIG. 3. For this embodiment, the bands of elastic material 34 are operative to urge the cover 26 against both the tread portion 38 and the push ring 40.

Figure 2:
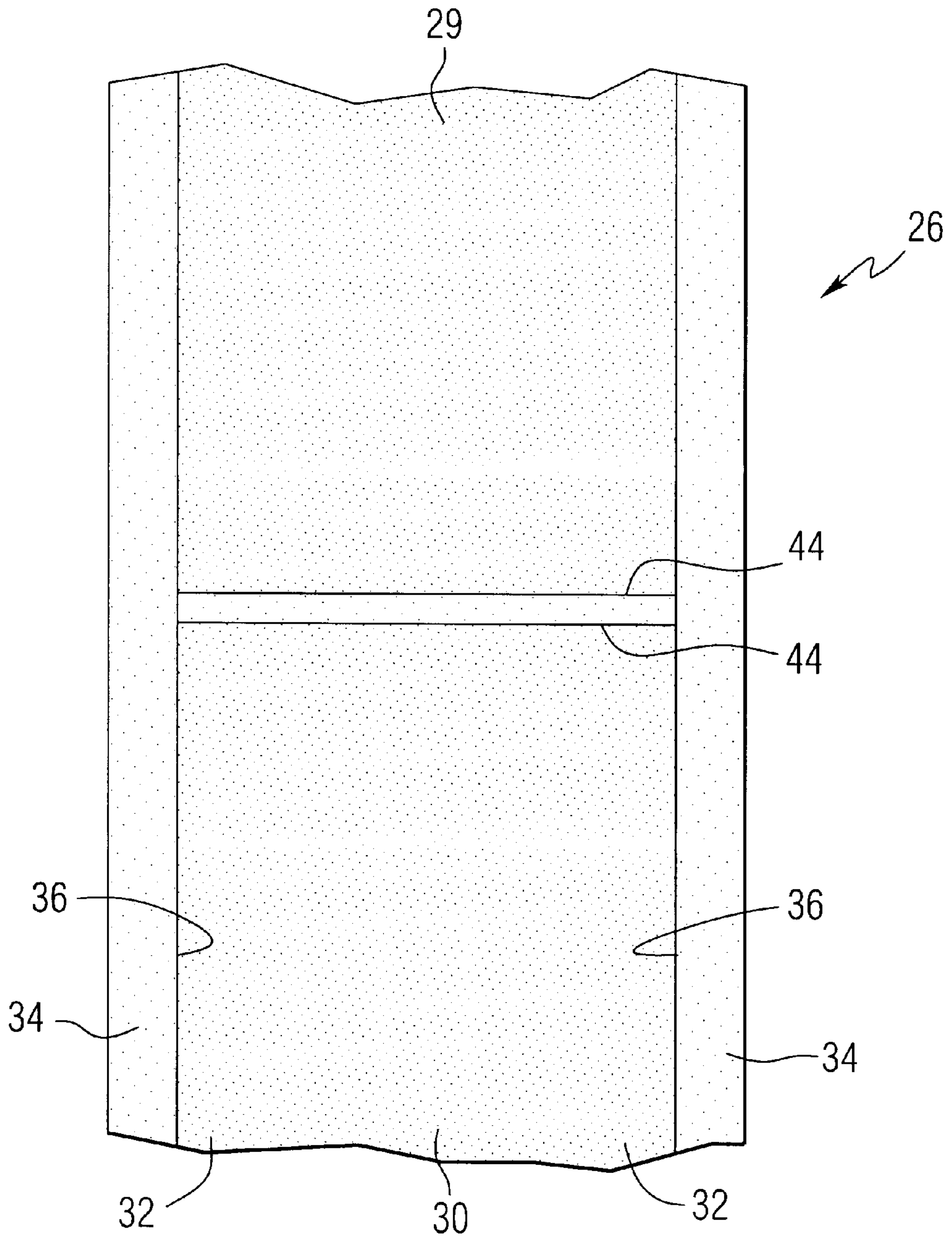
FIG. 2 is a bottom view of a section of the protective cover of FIG. 1.

Cover 26 may be formed from a ring of material having a generally circular perimeter as can be seen on FIG. 1. FIG. 2 illustrates a partial bottom view of cover 26 of FIG. 1. A strip of material 29 has a center portion 30 adapted to fit over the tread surface of tire 24. Attached to and preferably formed to be integral with the center portion 30 are opposed side portions 32 having inside diameter edges 36 disposed toward each other to form a generally tubular volume 27 as may be seen in FIG. 3. The side portions 32 are adapted to fit over the side walls 25 of the tire 24 so that the tire 24 is disposed within the generally tubular volume 27. A band of elastic material 34 is attached to the edge 36 of each of the respective side portions 32. The elastic material 34 may be attached by any known means in the art, such as by sewing or by an adhesive. The bands of elastic material 34 are operative to urge the center portion 30 against the tread portion 38 of tire 24.

Cover 26 may be conveniently manufactured by joining opposed short ends 44 of a generally rectangular strip of material 29 to form a ring shape. The respective ends 44 may be joined by sewing, gluing or other known joining process. The materials of construction of cover 26 must be flexible and are preferably washable or otherwise cleanable. Alternatively, cover 26 may be made from a paper or other inexpensive material and may be designed to be disposable after a limited duration of use. In one embodiment the strip of material 29 is a single generally rectangular shaped strip of a sueded polyester fabric material such as is sold under the trademark Conlure. This material has an inside surface 46 in contact with tire 24 which has a rough texture in order to promote friction between the cover 26 and the tire 24. The outside surface 48 of the sueded material has a soft texture in order to protect the hands of the wheelchair user. The strip of material 29 may alternatively be an elastic material, in which case the separate bands of elastic material 34 may optionally be deleted.

Cover 26 may be made entirely without elastic properties, however such an embodiment would be operative for only a single sized tire. By providing either an elastic band 24 and/or elastic material for the ring of material 29 used to form cover 26, a single cover 26 may be useable on more than one size tire. It may also be appreciated that by providing cover 26 with an elastic property, the installation of To the cover onto the tire 24 is made much easier for the wheelchair user to accomplish from within the wheelchair 10. To install the cover 26, a portion of the cover may be placed over the conveniently reachable portions of tire 24, whereupon the wheelchair is rolled forward or backward to bring the uninstalled portion of cover 26 within easy reach of the user.

Figure 4:
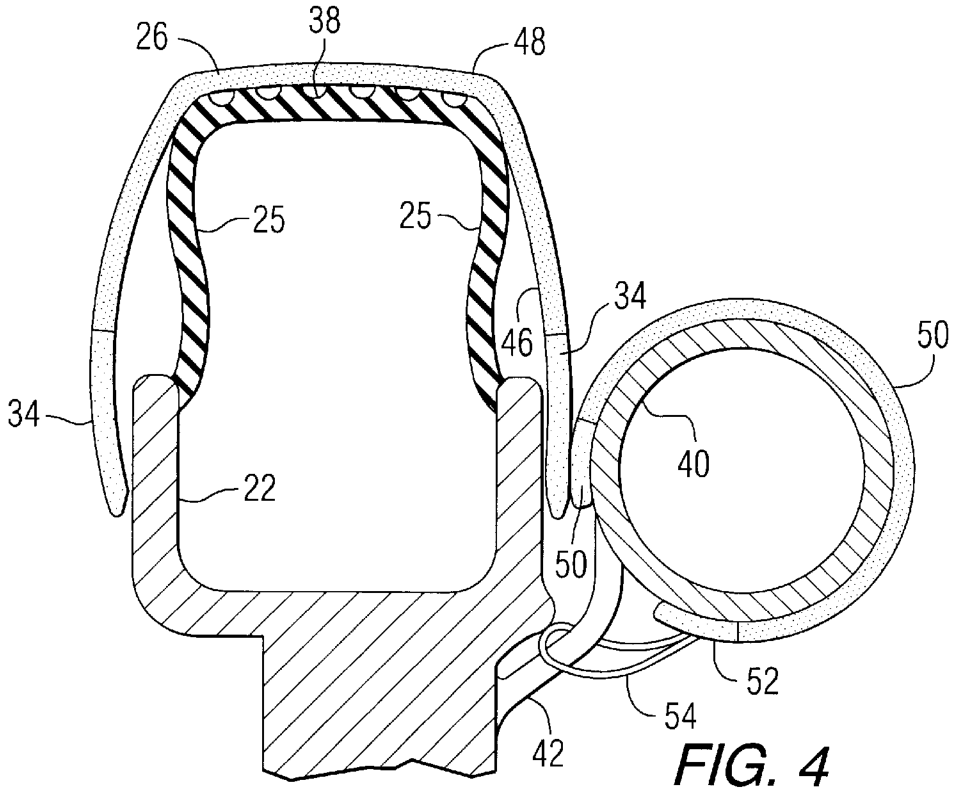
FIG. 4 is a sectional view of a protective cover disposed over a wheelchair tire and a second protective cover disposed over the push ring of the wheelchair.

FIG. 4 illustrates an alternative embodiment of the invention wherein there is a first cover 26 disposed over tire 38 and a second cover 50 disposed over push ring 40. Second cover 50 may have elastic bands 52 and/or may have ties 54 operable to be fastened to the brackets 42 used to support the push ring 40. The selection of material for the cover 50 may be the same as cover 26 or may be a rubber or other material providing improved friction against push ring 40, which is typically a stainless steel or chrome material. Cover 50 may remain installed over push ring 40 while cover 26 may alternately be installed and removed at will as the wheelchair 10 is moved between contaminated and noncontaminated surfaces.

I claim as my invention:

1. A wheelchair comprising:

a chair portion;

a wheel rotatingly attached to the chair portion;

a tire attached around a rim of the wheel; and a cover removeably attached around the tire, wherein the cover further comprises material having a center portion adapted to fit over a tread surface of the tire and opposed side portions attached to the center portion and adapted to fit over side walls of the tire, and further comprising a band of elastic material attached to an edge of each of the respective side portions, the bands of elastic material operable to urge the center portion against the tread surface.

2. The wheelchair of claim 1, wherein the cover comprises an elastic material.

3. The wheelchair of claim 1, wherein the cover comprises a washable material.

4. The wheelchair of claim 1, further comprising:

a push ring attached to the wheel; and wherein the cover is disposed around the tire and push ring.

5. The wheelchair of claim 1, Further comprising:

a push ring attached to the wheel;

a second cover removeably attached around the push ring.

6. The wheelchair of claim 1, wherein the cover further comprises an inside surface in contact with the tire and having a rough texture and an outside surface having a soft texture.

7. The wheelchair of claim 1, wherein the cover comprises one of a sueded polyester and a paper material.

8. A cover for a wheelchair tire, the wheelchair tire having a tread surface and opposed side walls attached to the tread surface, the cover comprising material having a center portion adapted to fit over the tread surface and opposed side portions attached to the center portion and adapted to fit over the respective side walls, and further comprising a circumferential band of elastic material attached along an edge of each of the respective side portions, the respective bands of elastic material operable to urge the center portion against the tread surface when the cover is installed on the wheelchair tire.

9. The cover of claim 8, wherein the center portion is sized to fit over the tread surface and over a push ring attached to the wheelchair tire, and wherein the bands of elastic material are operable to urge the center portion against the tread surface and the push ring when the cover is installed on a wheelchair tire connected to a push ring.

10. The cover of claim 8, wherein the material further comprises a generally rectangular strip of material having opposed edges attached to each other to form a ring shape.

11. The cover of claim 8, wherein the material further comprises an inside surface having a rough texture and an outside surface having a soft texture.

12. The cover of claim 8, wherein the material comprises one of a sueded polyester and a paper material.

13. A cover for a wheelchair tire, the cover comprising:

a material having a generally circular perimeter and having two opposed inside diameter edges disposed toward each other to define a generally tubular volume; and elastic material circumferentially attached to each of the two opposed inside diameter edges, the elastic material operable to urge the ring of material against a wheelchair tire disposed within the generally tubular volume.

14. The cover of claim 13, wherein the ring of material further comprises an inside surface having a rough texture and an outside surface having a soft texture.

15. The cover of claim 13, wherein the ring of material comprises one of a sueded polyester and a paper material.

16. A wheel for a wheelchair, the wheel comprising:

a rim;

a tire mounted on the rim;

a cover removably attached to the tire wherein the cover further comprises a center portion adapted to fit over a tread surface of the tire and opposed side portions attached to the center portion and adapted to fit over respective side walls of the tire, and further comprising;

a band of elastic material attached along an edge of each of the respective side portions, the respective bands of elastic material operable to urge the center portion against the tread surface.

17. The wheel of claim 16, wherein the cover further comprises an inside surface in contact with the tire and having a rough, texture and an outside surface having a soft texture.

18. The wheel of claim 16, wherein the cover comprises one of a sueded polyester and a paper material.

19. A method of operating a wheelchair, the method comprising the steps of:

moving the wheelchair over a surface contaminated with a foreign substance so that a tire of the wheelchair becomes contaminated with the foreign substance;

installing a removable cover over the tire of the wheelchair; and moving the wheelchair onto a surface not contaminated with the foreign substance.

20. The method of claim 19, further comprising the steps of:

removing the removable cover from the tire;

moving the wheelchair away from the surface not contaminated with the foreign substance.

21. The method of claim 20, further comprising the step of cleaning the removable cover; and reinstalling the removable cover over the tire of the wheelchair prior to again moving the wheelchair onto a surface not contaminated with the foreign substance.

22. The method of claim ,storing the removable cover on the wheelchair prior to the step of installing.

23. A method of protecting against the spread of contamination by a wheelchair tire, the method comprising the steps of:

providing a cover adapted to be removably installed over a wheelchair tire; and covering a contaminated wheelchair tire with the cover prior to rolling the tire onto a surface to be protected from contamination.

24. The method of claim 23, further comprising the step of removing the cover upon rolling the tire off of the surface to be protected from contamination.

25. A wheelchair having front wheels and rear wheels, wherein the improvement comprises a removable cover disposed over each of the rear wheel wheels.

* * * * *